United States Patent Office 3,794,601
Patented Feb. 26, 1974

3,794,601
ANIONIC SURFACTANT SLURRY CONTAINING DIHEXYL ETHER AS VISCOSITY REDUCER AND METHOD OF PROVIDING SAID SLURRY
Eugene F. Kennedy, Ponca City, Okla., assignor to Continental Oil Company, Ponca City, Okla.
No Drawing. Filed Feb. 28, 1972, Ser. No. 230,132
Int. Cl. B01f 17/00, 17/02, 17/12
U.S. Cl. 252—355       8 Claims

ABSTRACT OF THE DISCLOSURE

The viscosity of anionic surfactant slurries is reduced by admixing with such slurries an effective amount of dihexyl ether.

FIELD OF THE INVENTION

This invention relates to anionic surfactant slurries having reduced viscosities. This invention further relates to a method for reducing the viscosity of anionic surfactant slurries by the addition of dialkyl ethers.

PRIOR ART

Anionic surfactant materials have been prepared by a variety of processes such as sulfation and sulfonation with gaseous $SO_3$, chlorosulfonic acid and the like. In most such processes an anionic surfactant slurry results. Such slurries typically contain the anionic surfactant material, free oil, water and inorganic salts. To facilitate further processing it is desirable that the viscosity of such slurries be reduced. Most prior methods for reducing the viscosity of such slurries have involved the addition of inorganic salts. While effective, such viscosity reducers have the disadvantage that they oftentimes modify the solubility characteristics of the product and render it less stable. Accordingly, much time and effort has been devoted to a search for a method for reducing the viscosity of such slurries which does not suffer the same disadvantages.

OBJECTS OF THE INVENTION

It is an object of this invention to provide a method for reducing the viscosity of anionic surfactant slurries. It is a further objective of this invention to provide anionic surfactant slurries having a reduced viscosity.

SUMMARY OF THE INVENTION

It has been found that the objectives of the present invention are achieved by admixing with anionic surfactant slurries an effective amount of a compound having the general formula, R—O—R', where R and R' are alkyl groups each containing from about 3 to about 12 carbon atoms and R plus R' contain a total of from about 6 to about 16 carbon atoms.

DESCRIPTION OF PREFERRED EMBODIMENTS

The method of the present invention is useful for reducing the viscosity of anionic surfactant slurries. Such slurries will typically contain the anionic surfactant materials, free oil remaining from the surfactant forming reaction, water, inorganic salts and the like. While the slurry composition may vary widely, a typical slurry would contain from about 25 to about 60 weight percent anionic surfactant material, from about 0.5 to about 5.0 weight percent free oil and up to about 1.0 weight percent inorganic salt with the balance being water (i.e. up to about 73.5 weight percent water).

Such slurries are useful as surfactants and raw materials in the production of anionic surfactant containing products. The slurries are particularly useful as raw materials in that the slurries are readily shipped as anionic surfactant intermediates for formulation at remote locations into a variety of anionic surfactant products.

Anionic surfactant materials such as, but not limited to, alcohol sulfates containing from about 10 to about 16 carbon atoms, ether sulfates containing from about 10 to about 16 carbon atoms and from about 0.5 to 5.0 moles of ethylene oxide per mole of alcohol, alkylbenzene sulfonates containing from about 10 to about 14 carbon atoms in the alkyl portion, alkyl hydroxy sulfonates containing from about 12 to about 20 carbon atoms, and alkene sulfonates containing from about 12 to about 20 carbon atoms are useful in the method of the present invention. Some specific examples of such anionic surfactants are dodecyl alcohol sulfate, hexadecyl alcohol sulfate, dodecyl ethoxy sulfate, tetradecyl ethoxy sulfate, decylbenzene sulfonate, tetradecyl benzene sulfonate, tetradecyl sulfonate, octadecyl sulfonate, 3-hydroxy-1-hexadecane sulfonate, 2-hexadecene-1-sulfonate and the like. Such compounds are generally referred to in the art by the type material, i.e. alcohol sulfates, ethoxylated alcohol sulfates, etc. and the number of carbon atoms in the hydrocarbon portion. Such terminology will be used hereinafter.

The free oil is normally unreacted charge material, organic by-products of the reaction and the like.

The inorganic salt results from the reaction of residual sulfating or sulfonating acids with the cations used to neutralize the organic sulfuric and sulfonic acids corresponding to the anionic sulfate and sulfonate materials. Suitable cations for neutralizing the acids are sodium, potassium, calcium and magnesium. The cation may be added in any suitable form such as the hydroxides of the cations listed above. Particularly desirable results have been achieved wherein the salt was selected from the group consisting of sodium hydroxide, potassium hydroxide, and magnesium hydroxide.

The acids may be neutralized with ammonia or substituted amines such as diethanol amine, diethyl amine and the like. Particularly desirable results have been achieved wherein ammonia was used to neutralize the acids.

The viscosity of anionic surfactant slurries such as described above may be reduced substantially by mixing with such slurries a dialkyl ether having the formula: R—O—R' where R and R' are alkyl groups, each containing from about 3 to about 12 carbon atoms with R plus R' containing from about 6 to about 16 carbon atoms. It is desirable that no alkyl group lower than propyl be used and best results have been obtained where the alkyl groups are approximately the same size, i.e. where the carbon content of said alkyl groups varies by about 2 carbon atoms or less. Particularly desirable results have been obtained wherein dihexyl ether was used. The dialkyl ether is effective as a viscosity reducer in amounts varying from about 0.2 weight percent to about 5.0 weight percent of the slurry. Particularly desirable results have been obtained wherein the dialkyl ether was present in an amount equal to from about 0.5 to about 2.0 weight percent of the slurry.

The dihexyl ether may be added by any convenient method and is effective as a viscosity reducer when intimately mixed with the surfactant slurry. Many variations and modifications in the above procedure, slurry proportions and the like are possible within the scope of the present invention and may appear obvious or desirable to those skilled in the art in light of the above embodiments and the following examples and claims.

EXAMPLE I

An alcohol sulfate slurry was prepared containing 25.6 weight percent alcohol sulfate, wherein said alcohol sulfate was produced from a mixture of alcohols containing about 67 weight percent n-$C_{12}$ alcohol, about 27 weight percent n-$C_{14}$ alcohol and about 6 weight percent n-$C_{16}$ alcohol; 1.06 weight percent free oil and 0.42 weight percent sodium sulfate with the balance being water. The viscosity of the sample at 75° F. was 52.2 centipoises (cp.). One weight percent dihexyl ether was mixed with the slurry. The viscosity after mixing was 22.4 cp. at 75° F. The sodium alcohol sulfate was used and the viscosity values given represent an average of 4 tests on each sample.

EXAMPLE II

A mixture containing about 62 weight percent n-$C_{12}$ alcohol, about 29 weight percent n-$C_{14}$ alcohol and about 9 weight percent n-$C_{16}$ alcohol was sulfated and neutralized with sodium hydroxide to prepare a slurry containing 25.6 weight percent of alcohol sulfate, 1.06 weight percent free oil and 0.42 weight percent sodium sulfate with the balance being water. The viscosity of the slurry at 75° F. was 118.1 cp. One weight percent of dihexyl ether was added, the slurry was mixed well and the viscosity determined. The viscosity after the addition of dihexyl ether was 39.7 cp. at 75° F. The viscosity values reported are averages of four tests for each value given.

EXAMPLE III

A mixture of alcohols consisting of about 66 weight percent n-$C_{12}$ alcohol, about 26 weight percent n-$C_{14}$ alcohol and about 8 weight percent n-$C_{16}$ alcohol was sulfated and neutralized with sodium hydroxide to prepare an anionic surfactant slurry containing 25.6 weight percent alcohol sulfate, 1.06 weight percent free oil and 0.42 weight percent sodium sulfate with the balance being water. The viscosity of the sample at 75° F. was 29.3 cp. One weight percent dihexyl ether was mixed with the slurry. The viscosity after addition of the dihexyl ether was 9.9 cp. at 75° F. The test results reported are averages of four tests.

It is readily seen that by the addition of the dialkyl ether component substantial reductions in viscosity are achieved without the addition of inorganic salt materials and the like.

Having thus described the invention, I claim:

1. An anionic surfactant slurry having a reduced viscosity, said anionic surfactant slurry comprising from about 25 to about 60 weight percent anionic surfactant material; from about 0.5 to about 5.0 weight percent free oil; up to about 1.0 weight percent inorganic salt; up to about 74.8 weight percent water and as an essential ingredient from about 0.2 to about 5.0 weight percent dihexyl ether.

2. The slurry of claim 1 wherein said anionic surfactant material is selected from the group consisting of: alcohol sulfates containing from about 10 to about 16 carbon atoms, ether sulfates containing from about 10 to about 16 carbon atoms and from about 0.5 to about 5.0 moles of ethylene oxide per mole of alcohol, alkylbenzene sulfonates containing from about 10 to about 14 carbon atoms in the alkyl portion, alkyl hydroxy sulfonates containing from about 12 to about 20 carbon atoms and alkene sulfonates containing from about 12 to about 20 carbon atoms.

3. The slurry of claim 1 wherein the cationic portion of said sulfate and sulfonate material is selected from the group consisting of sodium, potassium, magnesium, ammonium and substituted amines.

4. The slurry of claim 1 wherein said dihexyl ether is present in an amount equal to from about 0.5 to about 2.0 weight percent of the slurry.

5. The slurry of claim 1 wherein said anionic surfactant slurry contains from about 25 to about 30 weight percent alcohol sulfate containing from about 10 to about 16 carbon atoms, from about 1.0 to about 2.0 weight percent free oil and about 0.42 weight percent sodium sulfate with the balance being water and said dihexyl ether is present in the amount of about one weight percent based on the slurry compositions.

6. A method for reducing the viscosity of anionic surfactant slurries, said method comprising admixing with said anionic surfactant slurries from about 0.2 to about 5.0 weight percent of dihexyl ether.

7. The method of claim 6 wherein said anionic surfactant is selected from compounds and mixtures of compounds selected from the group consisting of: alcohol sulfates containing from about 10 to about 16 carbon atoms, ether sulfates containing from about 10 to about 16 carbon atoms and from about 0.5 to about 5.0 moles of ethylene oxide per mole of alcohol, alkylbenzene sulfonates containing from about 10 to about 14 carbon atoms in the alkyl portion, alkyl hydroxy sulfonates containing from about 12 to about 20 carbon atoms and alkene sulfonates containing from about 12 to about 20 carbon atoms.

8. The method of claim 7 wherein said anionic slurry comprises from about 25 to about 60 weight percent anionic surfactant material, from about 0.5 to about 5.0 weight percent free oil and up to about 1.0 weight percent inorganic salt with the balance being water and wherein said cationic portion of said sulfate and sulfonate material is selected from the group consisting of sodium, potassium, magnesium, ammonium and substituted amines.

References Cited
UNITED STATES PATENTS

| | | | |
|---|---|---|---|
| 3,058,920 | 10/1962 | Brooks et al. | 252—353 X |
| 2,890,176 | 6/1959 | Ramsden et al. | 252—355 X |
| 2,077,005 | 4/1937 | Perkins et al. | 252—353 UX |
| 3,133,946 | 5/1964 | Maurer et al. | 252—353 X |

RICHARD D. LOVERING, Primary Examiner

U.S. Cl. X.R.
252—353, 550